United States Patent
Xu et al.

(10) Patent No.: US 10,292,083 B2
(45) Date of Patent: May 14, 2019

(54) SELF-OPTIMIZING METHOD FOR THE UE GROUP

(71) Applicant: Samsung Electronics Co., Ltd., Gyeonggi-do (KR)

(72) Inventors: Lixiang Xu, Beijing (CN); Hong Wang, Beijing (CN); Huarui Liang, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/761,908

(22) PCT Filed: Jan. 17, 2014

(86) PCT No.: PCT/KR2014/000535
§ 371 (c)(1),
(2) Date: Jul. 17, 2015

(87) PCT Pub. No.: WO2014/112836
PCT Pub. Date: Jul. 24, 2014

(65) Prior Publication Data
US 2015/0358887 A1    Dec. 10, 2015

(30) Foreign Application Priority Data

Jan. 18, 2013   (CN) .......................... 2013 1 0019519
May 10, 2013   (CN) .......................... 2013 1 0170715
Aug. 9, 2013    (CN) .......................... 2013 1 0347164

(51) Int. Cl.
*H04W 36/32*   (2009.01)
*H04W 36/00*   (2009.01)
*H04W 4/08*    (2009.01)

(52) U.S. Cl.
CPC ............ *H04W 36/32* (2013.01); *H04W 4/08* (2013.01); *H04W 36/0055* (2013.01); *H04W 36/00837* (2018.08); *H04W 36/0009* (2018.08)

(58) Field of Classification Search
None
See application file for complete search history.

(56) References Cited

U.S. PATENT DOCUMENTS 10,136,369 B2 *   11/2018   Pang ................ H04W 36/0083
2005/0118946 A1 *  6/2005   Colban ............... H04L 12/1881
                                                          455/3.06
(Continued)

FOREIGN PATENT DOCUMENTS

EP         2563070 A1       2/2013
WO    WO 2011/130912 A1    10/2011
(Continued)

OTHER PUBLICATIONS

International Search Report dated May 28, 2014 in connection with International Patent Application No. PCT/KR2014/000535, 3 pages.
(Continued)

*Primary Examiner* — German Viana Di Prisco

(57) ABSTRACT

The present application discloses a self-optimizing method for a UE group, which includes: a. a base station of a cell in the system adjusts mobility parameters of a specified UE group from the cell to another cell, and notifies the base station that the another cell belongs to of a relative value of mobility parameter change of the specified UE group in the cell; or, the base station of the cell requests base station of the another cell to adjust the mobility parameters of the specified UE group to the cell, and carry the relative value of mobility parameter change; b. the base station of the another cell determines which manner to take to adjust the
(Continued)

mobility parameters of the specified UE group according to the relative value of the mobility parameter change received.

20 Claims, 6 Drawing Sheets

(56) References Cited

U.S. PATENT DOCUMENTS

| | | | |
|---|---|---|---|
| 2011/0122859 A1 | 5/2011 | Song et al. | |
| 2012/0069732 A1 | 3/2012 | Xu et al. | |
| 2012/0224522 A1* | 9/2012 | Kim | H04W 4/06 370/312 |
| 2012/0231828 A1 | 9/2012 | Wang et al. | |
| 2012/0264417 A1 | 10/2012 | Gao et al. | |
| 2013/0088956 A1 | 4/2013 | Zhou et al. | |
| 2014/0064247 A1* | 3/2014 | Teyeb | H04W 36/0083 370/331 |
| 2015/0141021 A1* | 5/2015 | Kapoulas | H04W 36/32 455/441 |
| 2015/0245255 A1* | 8/2015 | Van Phan | H04W 36/0016 455/457 |
| 2015/0312816 A1* | 10/2015 | Centonza | H04W 28/18 455/438 |
| 2015/0334609 A1* | 11/2015 | Waldhauser | H04W 36/0061 455/436 |
| 2015/0350968 A1* | 12/2015 | Da Silva | H04W 36/005 455/439 |

FOREIGN PATENT DOCUMENTS

| | | | | |
|---|---|---|---|---|
| WO | WO 2012-159340 A1 | 11/2012 | | |
| WO | WO 2013072271 A1 * | 5/2013 | | H04W 36/22 |
| WO | WO 2014086396 A1 * | 6/2014 | | H04W 36/0083 |

OTHER PUBLICATIONS

Written Opinion of International Searching Authority dated May 28, 2014 in connection with International Patent Application No. PCT/KR2014/000535, 4 pages.

Extended European Search Report dated Jun. 13, 2016 in connection with European Application No. 14740585.6, 7 pages.

* cited by examiner

[Fig. 3]
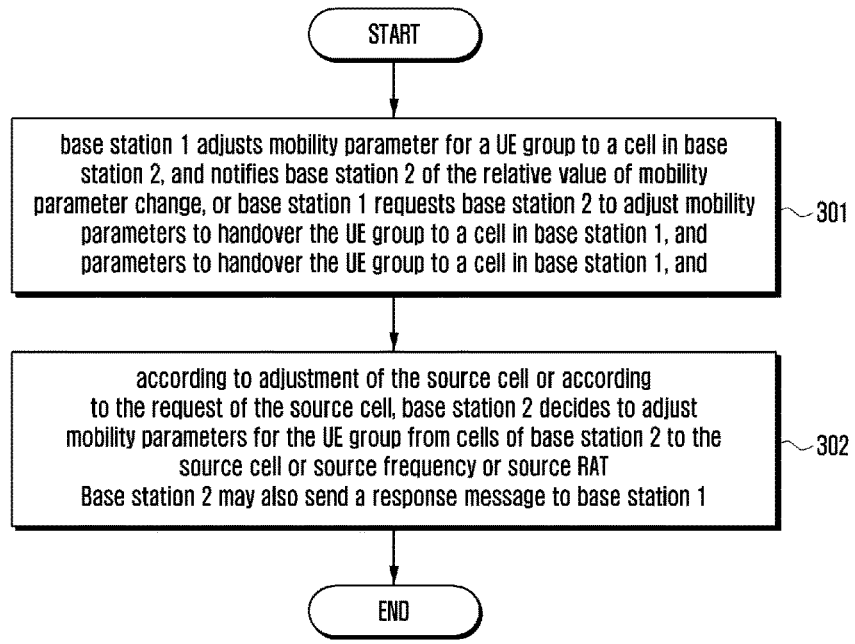
[Fig. 4]
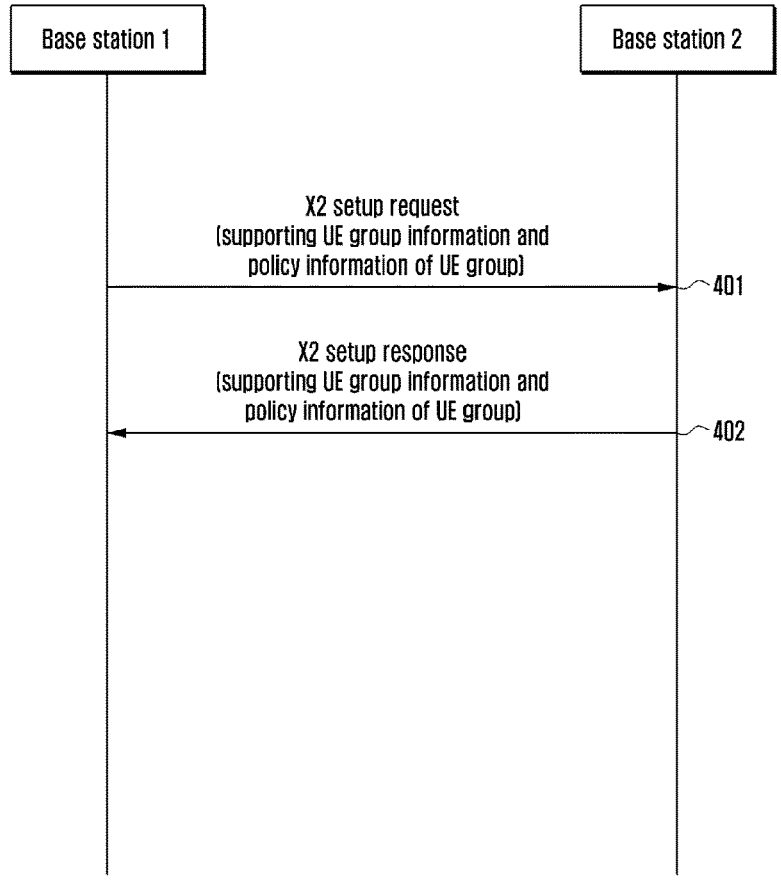

[Fig. 5]
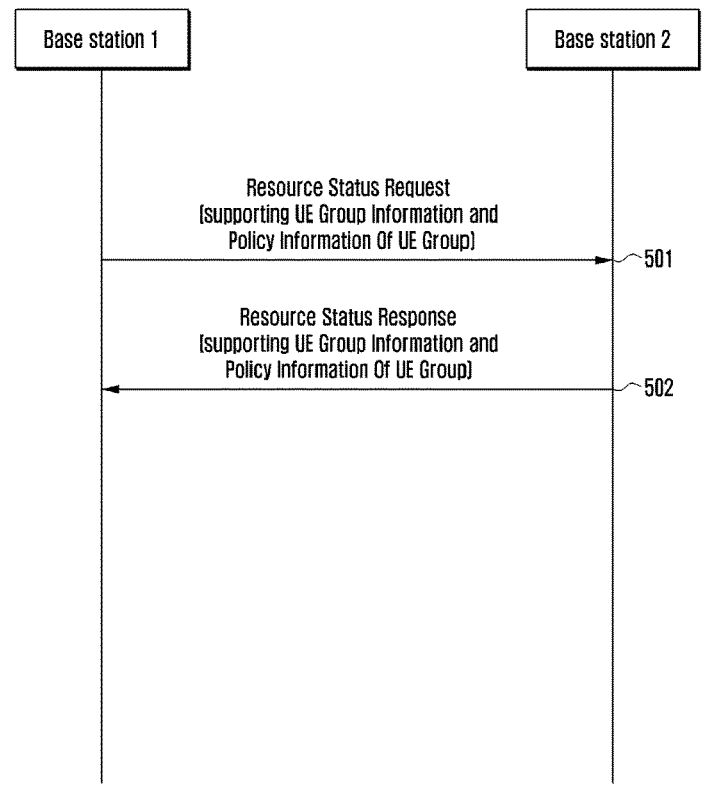
[Fig. 6]
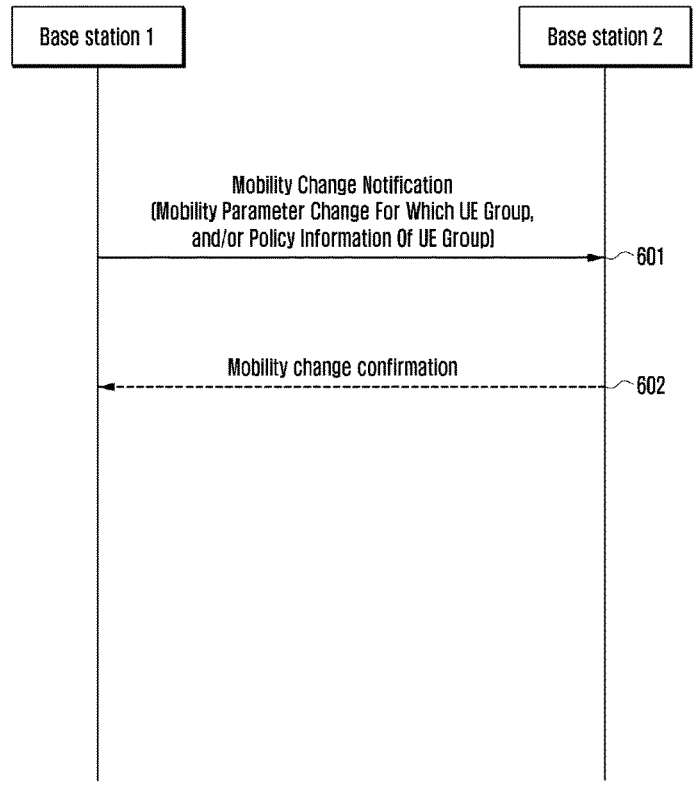

[Fig. 7]
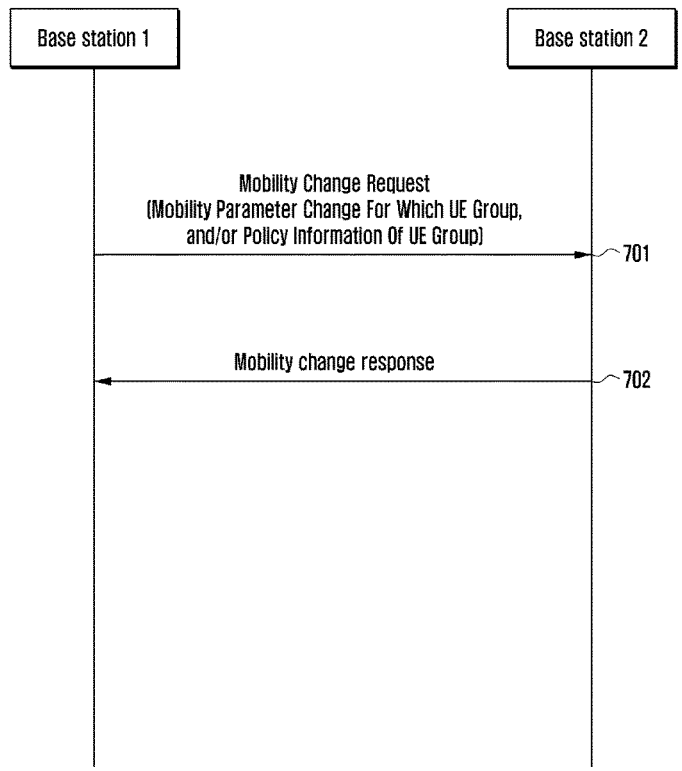
[Fig. 8]
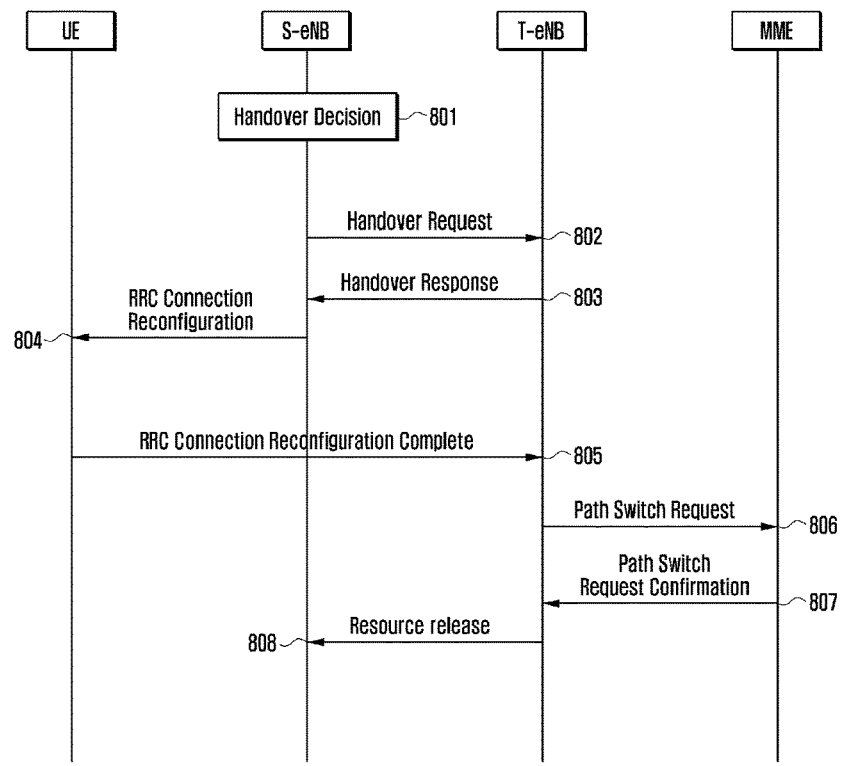

[Fig. 9]
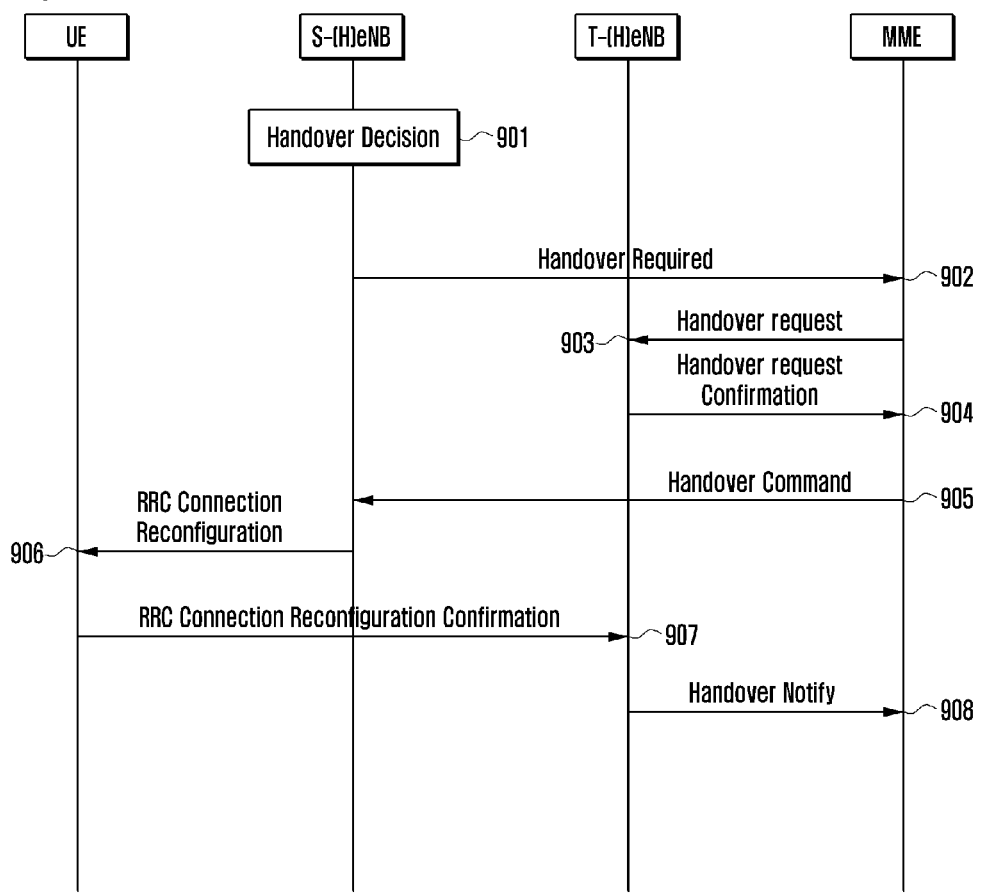

SELF-OPTIMIZING METHOD FOR THE UE GROUP

CROSS-REFERENCE TO RELATED APPLICATION(S)

The present application claims priority under 35 U.S.C. § 365 to International Patent Application No. PCT/KR2014/000535 filed Jan. 17, 2014, entitled "SELF-OPTIMIZING METHOD FOR THE UE GROUP". International Patent Application No. PCT/KR2014/000535 claims priority under 35 U.S.C. § 365 and/or 35 U.S.C. § 119(a) to Chinese Patent Application Nos. 201310019519.X filed Jan. 18, 2013, 201310170715.7 filed May 10, 2013, and 201310347164.7 filed Aug. 9, 2013, and which are incorporated herein by reference into the present disclosure as if fully set forth herein.

TECHNICAL FIELD

The present application relates to mobile communication system field, especially to a self-optimizing method for the UE group.

BACKGROUND ART

With the development of communication technology, mobile communication system has developed to System Architecture Evolution (SAE) system, and FIG. 1 is a diagram illustrating existing SAE system structure. As shown in FIG. 1, this system comprises Evolution-Ultra Terrance Radio Access Network (E-UTRAN) 101 and at least comprises core network of Mobile Management Entity (MME) 105 and Signaling Gateway (S-GW) 106, E-UTRAN 101 is used to connect User Equipment (UE) to the core network, and E-UTRAN 101 further comprises more than one macro base station (eNB) 102 and Home Base station (HeNB) 103, operational Home Base station Gateway (HeNB GW) 104, MME 105 and S-GW 106 can be integrated into one module, or be separated independently. Therein, eNB 102 are connected to one another through interface X2, and are connected to MME 105 and s-GW 106 through S1 respectively; HeNB 103 is connected to MME 105 and S-GW 106 directly, or, is connected to operational HeNB GW 104, which is connected to MME 105 and S-GW 106 through interface S1.

When a SAE system is established initially or during the SAE system operation, a large amount of human resources and material resources are required to optimize SAE system's parameters, especially wireless parameters, so as to guarantee good coverage and capacity, mobile robustness, mobile load balance of the SAE system as well as UE access speed etc. to save human resource and material resource configuration during a SAE system operation, at present, a self-optimizing method of SAE system is provided. During the self-optimizing process, eNB setting or HeNB setting is optimized according to current state of SAE system actually, and the self-optimizing method of SAE system will be illustrated hereinafter by calling eNB and HeNB as eNB uniformly.

FIG. 2 is a diagram illustrating the basic principle of self-optimizing process of a SAE system, as shown in FIG. 2, after eNB is powered on or connected to SAE, the self-optimizing process can start, and this process comprises basic configuration of eNB and initial wireless parameter configuration. Therein, basic configuration of eNB comprises configuring eNB Internet Protocol (IP) address and detecting Operation, Maintenance and Management (OA&M); authentication between eNB and core network; when eNB is HeNB, it is needed to detect which HeNB GW the HeNB belongs to; download eNB software and operation parameters to configure itself. Initial wireless parameter configuration is performed according to experience or simulation, and performance of each eNb in the SAE system will be affected by environment of the located area, so eNB has to perform initial configuration of adjacent cell lists and initial configuration of load balance according to initial wireless parameter configuration of environment of the located area. After finishing the configuration process, many parameters configured by eNB are not optimized ones, in order to provide better performance for SAE system, it is needed to optimize or adjust configuration of eNB, or called self-optimization of mobile communication system. When optimizing or adjusting the configuration of eNB, the backstage OA&M can control eNB to finish the operation, and there is a standardized interface between OA&M and eNB, OA&M sends the to-be-optimized parameters to eNB (eNB or HeNB) through this interface, and eNB optimizes the parameters configured by it according to the to-be-optimized parameters. Of course, it can also be finished by eNB itself, namely eNB detects which performances are to be optimized, and optimizes and adjusts corresponding parameters. Optimizing or adjusting configuration of eNB may comprise: self-optimization of adjacent cell list, self-optimization of coverage and capacity, self-optimization of mobile robustness, self-optimization of load balance and self-optimization of Random Access Channel (RACH) parameters, etc.

At present, basic principle of self-optimization of load balance is: neighbor cells exchange load information, when load balance is needed, the source cell can switch a UE under service to a neighbor target cell, and the target cell executes access control. When load balance is needed, the source cell can request the target cell to change switch parameter or cell reselecting parameter. The source cell notifies the target cell of relative change of cell switch trigger, and switch trigger is the special offset of a cell's triggering the switch preparing procedure. The target cell can accept the source cell's request. The source cell considers response value when executing the planned mobile parameter change.

DISCLOSURE OF INVENTION

Technical Problem

Existing mechanism can only be used for generally adjusting handover trigger between two cells, but different UE have different resource requirements because of different service requirements and UE status are different, change of handover trigger between two cells generally cannot solve the load balance problem completely or with deep degree. Especially for load balance between different access systems, resources of different systems guarantee different services, and generally change of handover trigger may even bring negative effect to a part of UE.

Exiting Mobile Robustness self-Optimization (MRO) decides the reason of handover Failure (HOF) or Radio Link Failure (RLF) by considering mobility parameters of UE according to UE context during problem detection. But UE's practical situation is not taken into consideration when solve the failure problem. If the problem is not well solved, while it is good for part of the UE, it may also bring negative effect to the other part of UE.

Solution to Problem

Therefore, the present invention provides a self-optimizing method for the UE group, so that different base stations can perform self-optimization for different UE group according to practical situations of cell resources and UE, so as to improve self-optimization performance, and take use of radio resource and system resource to the most degree, and improve mobile communication system performance.

To reach the above object, technical scheme of embodiments of the present invention is implemented as follows:

The present invention provides a self-optimizing method for UE group, comprising:

A self-optimizing method for UE group, wherein, comprises:

a. adjusting, by a base station of a cell in system, mobility parameters of a specified UE group from the cell to another cell, and notifying a base station of the another cell of a relative value of mobility parameter change for the specified UE group in the cell; or, requesting, by the base station of the cell, the base station of the another cell to adjust the mobility parameters for the specified UE group from another cell to the cell, and carrying the relative value of the mobility parameter change;

b. determining, by the base station of the another cell, which manner to take to adjust the mobility parameters for the specified UE group according to the relative value of the mobile parameter change received.

Preferably, the specified UE group comprises: a UE group with only non-Guarantee Bit Rate (non-GBR) bearer or a UE group with Guarantee Bit Rate (GBR) bearer, and/or a UE group with non-GBR bearer only in downlink or a UE group with non-GBR bearer only in uplink, and/or a UE group with GBR bearer only in downlink or a UE group with GBR bearer only in uplink, and/or a UE group with uplink service or a UE group with downlink service, and/or a high-speed UE group or a low-speed UE group, and/or a UE group with CRE configuration or a UE group without CRE configuration.

Preferably, this method further includes step a0 before the step a: exchanging, by the base station of the cell, with the base station of the another cell the function information of Mobile Load Balance (MLB) and/or Mobile Robustness (MRO) for a UE group Preferably, the function information of MLB and/or MRO for a UE group comprises: information of whether the base station supports MLB and/or MRO functions for UE group, and/or information of which UE groups the base station supports MLB and/or MRO functions, and/or information of policy by which the base station performs UE grouping.

Preferably, wherein, the information of strategy for UE grouping comprises: mobility state information used to differentiate high-speed UE and low-speed UE, and/or UE capability information according to which UE grouping is performed when UE capability is taken into account, and/or QoS information according of services received by UE according to which UE grouping is performed, and/or mobility parameters relevant information according to which UE grouping is performed.

Preferably, X2 interface is utilized to transmit the relative value of the mobility parameter change in step a, and X2 Setup or Resource Report Initialization procedure is utilized to exchange function information of MLB and/or MRO for UE group in step a0.change Preferably, the relative value of mobility parameter change is transmitted by utilizing S1 interface in step a, and the function information of MLB and MRO for UE group is exchanged by utilizing S1 message through S1 interface in step a0.change;

preferably, the relative value of mobility parameter change is transmitted through RIM procedure in step a, and the function information of MLB and MRO for UE group is exchanged through RIM procedure in step a0.

Preferably, according to GBR available resource in a cell and its neighbor cell, adjust mobility parameter of the UE group with GBR bearer from the cell to its neighbor; and/or, according to non-GBR uplink/downlink available resource in a cell and its neighbor cell, adjust mobility parameter of the UE group with non-GBR bearer from the cell to its neighbor cell; and/or, according to GBR uplink/downlink available resource in a cell and its neighbor cell, adjust mobility parameter of the UE group with GBR bearer in uplink or that of UE group with GBR bearer in downlink from the cell to its neighbor cell.

Preferably, according to uplink available resource and downlink available resource of a cell and its neighbor cell, adjust mobility parameter of the UE group receiving uplink service or those of the UE group receiving downlink service.

Preferably, according to load situation of macro base station cell and its neighbor pico base station cell, adjust mobility parameter of high-speed UE group;

when RLF or handover failure happens between a cell and its neighbor cell, adjust mobility parameter of high-speed UE group or UE group configured with CRE from the cell to its neighbor cell.

Preferably, in step a, the cell adjusts mobility parameter of the specified UE or UE group to a frequency or to a radio access technology different from the radio access technology of the cell;

notifying base station of another cell is: notify base stations of all neighbor cells working at the frequency or in the another radio access technology of the neighbor cell.

Preferably, the mobility parameter change comprises of handover trigger change or cell reselecting parameter change.

Preferably, the notification or request comprises grouping information or grouping index of the specified UE group in step a.

Preferably, when the notification or request comprises grouping index of the specified UE group, grouping information corresponding to this grouping index is preset or is configured by Operation And Maintenance (OAM) center; base station of the another cell determines the UE group corresponding to the received grouping index according to the presetting or OAM configuration.

Advantageous Effects of Invention

It can be seen from the above technical scheme that, by applying the method of MLB and MRO for UE groups provided by the present application, different base stations can adjust mobility parameter of different UE groups pertinently according to practical situations of cell resources and UE, so as to implement self-optimization of UE groups, make maximum use of wireless resource and system resource, better support automatic parameter change in case of MLB self-optimization and MRO self-optimization, so that performance of mobile communication system is improved.

BRIEF DESCRIPTION OF DRAWINGS

FIG. 3 is a flowchart illustrating the process of the method of MLB and MRO for UE group;

FIG. 4 is a flowchart illustrating the procedure of two base station exchanging MLB or MRO function information of UE groups in embodiment 1 of the present invention;

FIG. 5 is a flowchart illustrating the procedure of two base station exchanging MLB or MRO function information of UE groups in embodiment 2 of the present invention;

FIG. 6 is a flowchart illustrating the process of automatic mobility parameter change in embodiment 1 of the present invention;

FIG. 7 is a flowchart illustrating the process of automatic mobility parameter change in embodiment 2 of the present invention;

FIG. 8 is a flowchart illustrating the process of automatic mobility parameter change in embodiment 3 of the present invention;

FIG. 9 is a flowchart illustrating the process of automatic mobility parameter change in embodiment 4 of the present invention.

MODE FOR THE INVENTION

Figure 1:
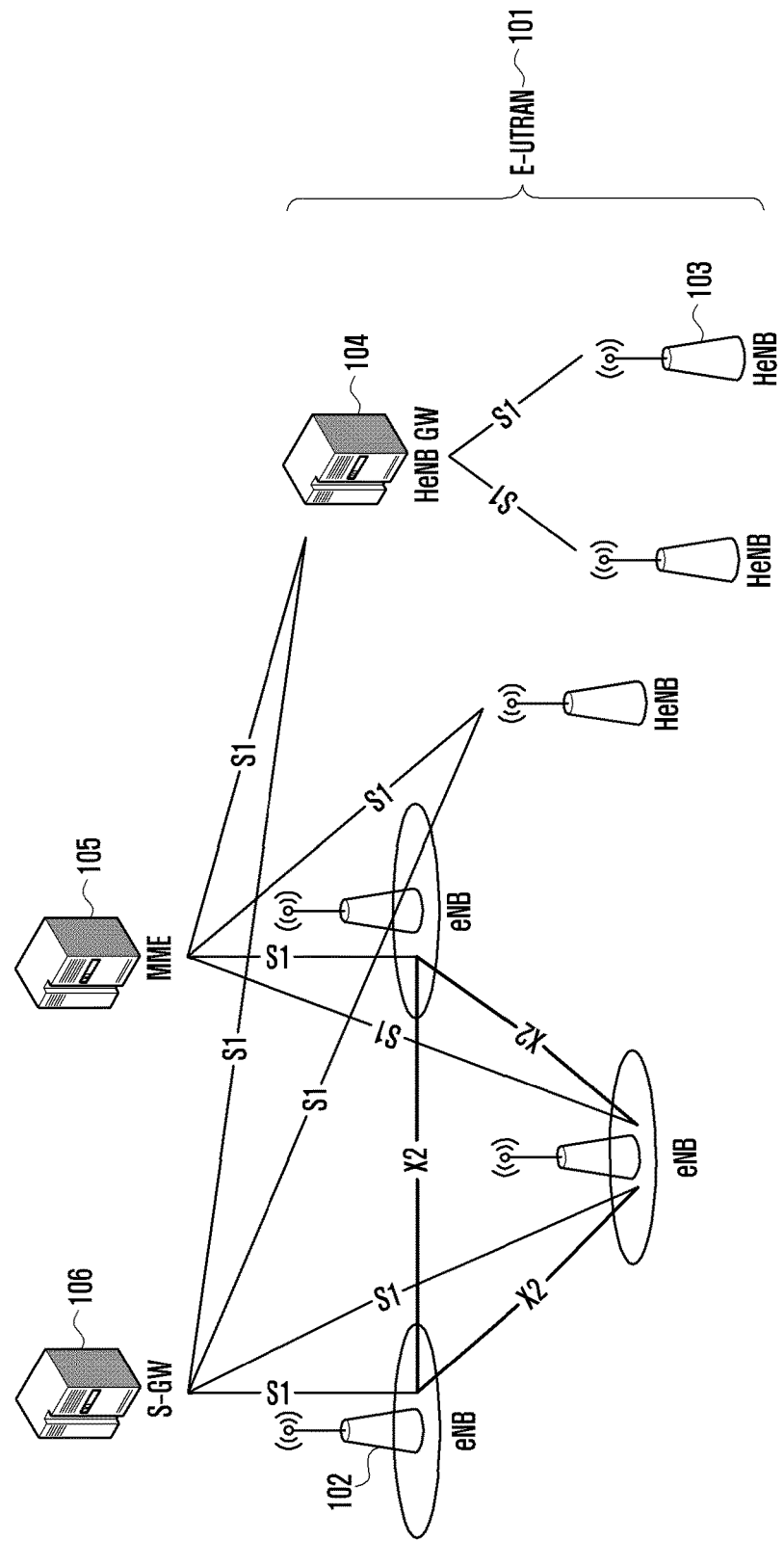
FIG. 1 is a diagram illustrating an existing SAE system structure.
Figure 2:
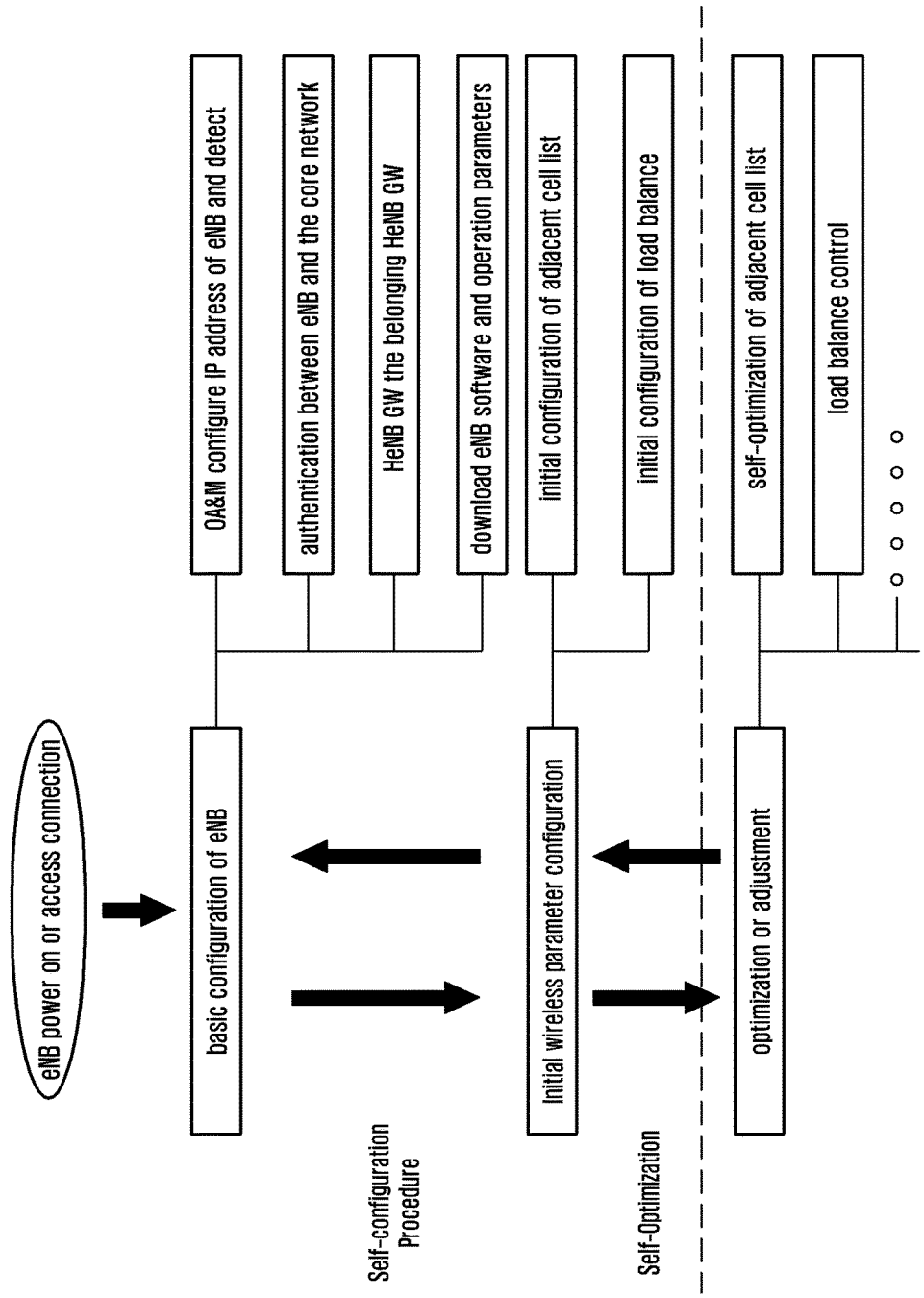
FIG. 2 is a diagram illustrating basic principle of self-optimization of an existing SAE system.

In order to make object, technical scheme and advantages of the present application clearer and easier to understand, the present application will be further illustrated in detail with reference to the drawings.

Basic idea of the present application is: when performing mobility parameter change among cells, it is performed aiming at divided UE groups. So different base stations can adjust mobility parameter of different UE groups pertinently according to practical situations of cell resources and UE, so as to make maximum use of radio resource and system resource, better support automatic parameter change in case of MLB self-optimization and MRO self-optimization, and performance of mobile communication system can be improved.

FIG. 3 is a flowchart illustrating the process of the method of self-optimization for UE group. Therein, the process will be illustrated by taking the example of adjusting mobility parameter for specified UE group between neighbor cells. It is assumed that cell 1 initiates the mobility parameter change, and base station of this cell is called base station 1, and a neighbor cell of this cell is cell 2, and base station of cell 2 is called base station 2. As shown in FIG. 3, this process comprises:

Step 301, cell 1 in base station 1 adjusts mobility parameter for the specified UE group for handover from cell1 to cell 2, and notifies base station 2 of the relative value of mobility parameter change, or base station 1 requests cells in base station 2 to adjust mobility parameter for the specified UE group for handover to cell 1, and the request message includes relative value of the mobility parameter change.

In the present application, UEs are divided into different UE groups. When mobility parameter change is performed, according to practical conditions of cell radio resource and UE, mobility parameter change is performed for one or several UE group. UEs can be divided into groups according to practical requirements, or by the system according to fixed settings. For example, UEs can be divided into a UE group that only with non-GRB bearer and a UE group with GBR bearer; and/or, a UE group that receives uplink service and a UE group that receives downlink service; and/or UE group with non-GBR bearer only in downlink or UE group with non-GBR bearer only in uplink; and/or UE group with GBR bearer in downlink or UE group with GBR bearer in uplink; and/or high-speed UE group and low-speed UE group, and/or UE group with CRE configuration and UE group without CRE configuration.

Considering characteristics of different UE groups, according to radio resource condition of the cell, mobility parameter change is performed taking a UE group as a unit. For example, mobility parameter change for a UE group may comprise one or more different UE group:

1) Perform mobility parameter change for UE group that only with non-GBR bearer or UE group with GBR bearer. For example, according to GBR available resource of cell 1 and the neighbor cell 2, perform mobility parameter change for UE group with GBR bearer in cell 1 and/or cell 2. More specifically, for example, in cell 1 of base station 1, if there are a lot of GBR available resources, while there are less GBR available resources in cell 2 of base station 2, in order to balance the load, base station 1 can request base station 2 to adjust mobility parameter of the UE group with GBR bearer in cell 2 for handover to cell 1, so that this part of UEs are more prone to or earlier to access cell 1 of base station 1, namely when this part of UEs are at the border of cell 1 and cell 2, UE with GBR bearer are more easily to access cell 1 of base station 1. Or cell 1 of base station 1 adjusts mobility parameters of this part of UEs in cell 1, so that this type of UEs in cell 1 are more prone to access cell 1 under control of base station 1, namely when this part of UEs are at the border of cell 1 and cell 2, UEs with GBR bearer are more prone to access a cell in base station 1.

2) Perform mobility parameter change for UE group receiving uplink service or UE group receiving downlink service. For example, according to uplink available resource and downlink available resource status of cell 1 and those of cell 2, perform mobility parameter change for the UE group receiving uplink service or UE group receiving downlink service in cell 1 and/or cell 2. More specifically, for example, in cell 1 of base station 1, if there are a lot of uplink available resources while less downlink resources, in order to balance the load, base station 1 can request base station 2 to adjust mobility parameters for the UE group receiving uplink service in cell 2, so that this part of UEs are more prone to or earlier to access cell 1 in base station 1, namely when this part of UEs are at the border of cell 1 and cell 2, UEs receiving uplink service are more easily to access cell 1 in base station 1. Or cell 1 in base station 1 adjusts mobility parameters (handover trigger change or cell reselecting parameter change) of this part of UEs in cell 1, so that these UEs in cell 1 are more easily to access cell 1 in base station 1, namely when these UEs are at the border of cell 1 and cell 2, UEs receiving uplink service are more easily to access a cell in base station 1. Similarly, base station 1 may also request or notify base station 2 the mobility parameters change for the UE group receiving downlink service in the opposite direction.

3) Perform mobility parameter change for UE group that only with non-GBR bearer in downlink or UE group that only with non-GBR bearer in uplink. For example, according to uplink/downlink non-GBR available resource condition of cell 1 and that of the neighbor cell 2, perform mobility parameter change for UE group with non-GBR bearer in cell 1 and/or cell 2. More specifically, for example, in cell 1 of base station 1, if there are more non-GBR downlink available resources in cell 1 in base station 1, while there are less non-GBR downlink available resources in cell 2 in base station 2, in order to balance the load, base station 1 can request base station 2 to adjust mobility parameters for UE group using non-GBR downlink resources in cell 2, so that this part of UEs are more prone or earlier to access cell 1 in base station 1, namely when these UEs are at the border of cell 1 and cell 2, UE using non-GBR downlink resource are more easily to access a cell in base station 1. Or cell 1 in base station 1 adjusts mobility parameters of this part of UEs in cell 1, so that these UEs in cell 1 are more easily to access cell 1 under control of base station 1, namely when these UE are at the border of cell 1 and cell 2, UEs using non-GBR downlink resource are more easily to access a cell in base station 1.

4) Perform mobility parameter change for UE group with GBR bearer in downlink or with GBR bearer in uplink. For example, according to uplink/downlink GBR available resource condition of cell 1 and that of the neighbor cell 2, perform mobility parameter change for UE group with GBR bearer in cell 1 or cell 2. More specifically, for example, in cell 1 of base station 1, if there are more GBR downlink available resources in cell 1 in base station 1, while there are less GBR downlink available resources in cell 2 in base station 2, in order to balance the load, base station 1 can request base station 2 to adjust mobility parameters for UE group using GBR downlink resources in cell 2, so that this part of UEs are more prone or earlier to access cell 1 in base station 1, namely when these UEs are at the border of cell 1 and cell 2, UEs using GBR downlink resource are more easily to access a cell in base station 1. Or cell 1 in base station 1 adjusts mobility parameters of this part of UEs in cell 1, so that these UEs in cell 1 are more easily to access cell 1 under control of base station 1, namely when these UE are at the border of cell 1 and cell 2, UE using GBR downlink resource are more easily to access a cell in base station 1.

5) Perform mobility parameter change for high-speed UE group or low-speed UE group. For example in a heterogeneous network scenario, according to load condition of macro base station cell and that of neighbor pico base station cell, adjust mobility parameter of high-speed UE group in macro cell and/or pico cell. More specifically, for example, if load of macro base station cell 1 is relatively low, while load of pico base station cell 2 is relatively high, the macro base station can request pico base station to adjust mobility parameters of the high-speed UE group in cell 2, so that this part of UEs are more prone or earlier to access cell 1 in base station 1, namely when these UEs are at the border of cell 1 and cell 2, high-speed UEs are more easily to access a cell in the macro base station. Or cell 1 in macro base station adjusts mobility parameter of this part of UEs in cell 1 (handover trigger change or cell reselecting parameter change), so that these UEs in cell 1 are more easily to access cell 1 under control of base station 1, namely when these UEs are at the border of cell 1 and cell 2, high-speed UE are more easily to access a cell in macro base station.

Or when RLF or handover failure happens between cell 1 of base station 1 and cell 2 of base station 2, these failures happen for high-speed UE. Therefore, when RLF or handover failure happens between cell 1 in base station 1 and cell 2 in base station 2, adjust mobility parameter of the high-speed UE group in cell 1 and/or cell 2. More specifically, base station 1 can request base station 2 to adjust mobility parameter of cell 2 for handover to cell 1 for high-speed UEs, or base station 1 adjusts mobility parameter of cell 1 for handover to cell2 for high-speed UE, and notifies the change for high-speed UE group in the cell 1 to base station 2.

6) When RLF or handover failure happens between cell 1 in base station 1 and cell 2 in base station 2, these failure occurs for UEs with CRE configuration. Therefore, when RLF or handover failure happens between cell 1 of base station 1 and cell 2 of base station 2, adjust mobility parameter of the UE group with CRE configuration in cell 1 and/or in cell 2. More specifically, base station 1 can request base station 2 to adjust mobility parameter of cell 2 for UEs with CRE configuration for handover from cell 2 to cell 1, or base station 1 adjust mobility parameter of UEs with CRE configuration for handover from cell1 to cell 2, and notifies the change for the UE group with CRE configuration in the cell 1 to base station 2.

7) Perform mobility parameter change for UE group with different UE capabilities. Like UE supporting CRE capability and UE not supporting CRE capability.

It should be noted that, the mobility parameter change in the present application includes handover trigger parameter change or cell reselecting parameter change.

The notification or request message comprises the specified UE group information and relative value of mobility parameter change. The notification or request message that base station 1 sends to base station 2 may clearly comprise information of the specified UE group, and the neighbor base station gets to know base station 1 wants to or requests to adjust mobility parameter for which UE group according to the grouping information in the message. Or the notification or request message that base station 1 sends to base station 2 may comprise an index of grouping. Specific information corresponding to the index of UE group may be predefined or configured by Operation And Maintenance (OAM) center. Say 1 denotes a high-speed UE group, 2 denotes a low-speed UE group, and 3 denotes a UE group receiving uplink service. The neighbor base station gets to know base station 1 wants to or requests to adjust mobility parameter for which UE group according to the index in the message and the pre-definition or OAM configuration. In addition, as to cells among different frequencies or cells among different access system inter-RAT, the message can further comprise the threshold for which the mobility parameter change is applied, and the threshold of the mobility parameter change can be:

threshold of the minimum quality of the target frequency, and/or, threshold of the maximum quality of the source frequency, and/or threshold of the minimum quality of the target radio access technology, and/or, threshold of the maximum quality of the source radio access technology.

The notification or request message that base station 1 sends to base station 2 further comprises cell identifier of base station 1 cell (the source cell). Corresponding to mobility parameter change procedures among different Radio Access Technology (RAT), if the source cell is a LTE cell, the message further comprises Track Area Identifier (TAI) of the source cell, if the source cell is a UMTS cell, the message further comprises Location Area Identifier (LAI) and Route Area Code (RAC) of the source cell, and may further comprise Radio Network Controller Identifier (RNC ID) of the RNC that control the source cell.

In the request message that base station 1 sends to base station 2, it may comprise the frequency information. Base station 1 request base station 2 to adjust the handover trigger for handover to that frequency, and/or comprise identifier of the cell under control of base station 2. Base station 1 request base station 2 to adjust the handover trigger for handover from the cell to that frequency;

In the notification message that base station 1 sends to base station 2, it may comprise the frequency information. Base station 1 adjusts the handover trigger for handover from base station 1 cell to that frequency, and/or comprise identifier of the cell under control of base station 2 (the target cell).

In the notification message that base station 1 sends to base station 2, it may comprise the mobility processing policy of base station 1. The base station mobility processing policy comprises the base station's mobility processing policy to UE with GBR bearer, and/or the base station's mobility processing policy to UE with non-GBR bearer, and/or the base station's mobility processing policy to UE with CRE capability, and/or the base station's mobility processing policy to UE with both CRE capability and CRE configuration, and/or the base station's mobility processing policy to high-speed UE, and/or the base station's mobility processing policy to low-speed UE etc.

The message that base station 1 sends to base station 2 further comprises mobility information of this UE or UE group and/or the requested handover trigger change. The mobility information may be the same as description in 36.423 in 3rd Generation Partnership Project (3GPP) standard or a new defined group id, it can be an index, or be the specific mobility or handover parameters, if the target base station can accept the requested handover trigger change, the target base station can apply this change to all UEs with the same mobility information or with similar mobility information or within the UE group that this UE belongs to.

Thereby, when the request or notification message comprises cell identifiers of cells under control of base station 2, corresponding to the mobility parameter automatic change procedure among different RATs, if base station 2 controls LTE cell, the message further comprises TAI of base station 2 cell, if base station 2 controls UMTS cell, the message further comprises LAI and RAC of base station 2 cell, and may further comprise RNC ID of base station 2.

Step 302, with reference to source cell change or according to request of the source cell, base station 2 decides mobility parameter change for corresponding UE group from a cell under control of base station 2 to the source cell or source frequency or source RAT. Base station 2 may also send a response message to base station 1.

If base station 2 cannot accept the request of base station 1, base station 2 sends a failure message to base station 1. The failure message comprises mobility processing policy of base station 2. When base station 2 sends a success response message, the message can also comprise mobility processing policy of base station 2 or mobility processing policy for the UE group that this UE belongs to.

Thereby, the method provided by the present invention comprises two methods: base station 2 sending a response message and base station 2 not sending response message, and the former is not a mandatory step in this method.

If mobility setting change procedure is used between cells in different frequencies, base station 2 makes corresponding change for handover from base station 2 cell to the frequency of base station 1 cell according to relative change of the threshold for the UE group in base station 1 cell.

When base station 1 sends a request message to base station 2 in step 301, if base station 2 receives frequency information from base station 1 (namely base station 1 requests base station 2 to adjust the handover trigger to that frequency), base station 2 determines the source cell according to identifier of cell 1 comprised in the request message, and adjusts the relevant mobility parameter for the specified UE group for handover from cell 2 under control of base station 2 to the frequency of the source cell.

Or if base station 2 receives identifier of the cell under control of base station 2 from base station 1, base station 2 adjust the relevant mobility parameter for handover from the cell to the frequency of the source cell for the UE group.

Or, when base station 1 sends a notification message to base station 2 in step 301, if base station 2 receives frequency information from base station 1 (namely base station 1 adjust the handover trigger to that frequency), according to the received frequency information, base station 2 adjust relevant mobility parameter in all cells working at the frequency for the UE group for handover to the frequency of base station 1 cell.

It should be noted that, if the mobility parameter change performed by base station 1 in step 301 is to adjust handover parameter of corresponding UE group in cell 1 to a certain frequency or to another RAT, base station 1 needs to send notification message to all base stations that control the neighbor cells of cell 1 working at this frequency or of the another RAT, and the message can be a mobility change notification message, which comprises the same contents as in step 301, and it's not to be illustrated again. In another word, base station 1 sends the notification message in step 301 to multiple neighbor base stations working at the same frequency, or to multiple neighbor base stations belong to target RAT.

The base station receiving this notification message sends a response message to base station 1. Action of the base station receiving the message and contents comprised in the response message are the same as that in step 302, which is not to be illustrated hereby.

By now, working process of the method aiming at UE group provided by the present invention is finished. This method is applicable to mobility load balance and mobility robustness optimization especially. In the above-mentioned process of the method, in order to better implement mobility load balance and mobility robustness optimization process, the two base stations can exchange respective MLB and/or MRO function information beforehand, so that the mobility parameter change can be performed according to the MLB and/or MRO supporting function information.

FIG. 4 is a flowchart illustrating the procedure of two base station exchanging MLB or MRO function information for UE group in embodiment 1 of the present invention. As shown in FIG. 4, this procedure comprises:

Step 401, base station 1 sends X2 setup request message to base station 2.

The message comprises MLB and/or MRO function information of base station 1, and may comprise specifically: information of whether supporting MLB and/or MRO functions for UE group, and/or information of supporting MLB and/or MRO functions for which UE groups, and/or UE grouping policy, and/or mobility processing policy information of base station 1, etc. Mobility processing policy of the base station comprises that for GBR UE for example, and/or that for non-GBR UE, and/or that for UE with CRE capability, and/or that for UE with both CRE capability and CRE configuration, and/or that for high-speed UE, and/or that for low-speed UE, and so on.

The message may include the mobility information. The mobility information indicates to eNB2 how eNB1 group UE with different group index. Then when eNB2 receives the group index from eNB1, eNB2 can know the meaning of the group index or what group of UE the index indicate.

Policy information of UE grouping can be set on command, for example mobility speed information used for distinguishing high-speed UE and low-speed UE, the UE capability information used for grouping and/or how to differentiate the UE capability. Base station 2 stores the information of corresponding base station 1. When MLB and MRO will be executed between cell of base station 1 and cell of base station 2, base station 2 can decide how to adjust mobility parameters between cell of base station 1 and cell of base station 2 according to MLB and/or MRO function information of base station 1.

Step 402, base station 2 sends a X2 setup response message to base station 1.

The message comprises MLB and/or MRO function information of base station 2, and may comprise specifically: information of whether supporting MLB and/or MRO functions for UE group, and/or information of supporting MLB and/or MRO functions for which UE groups, and/or UE grouping policy, and/or mobility processing policy information of base station 2, etc. Mobility processing policy of the base station comprises that for GBR UE for example, and/or that for non-GBR UE, and/or that for UE with CRE capability, and/or that for UE with both CRE capability and CRE configuration, and/or that for high-speed UE, and/or that for low-speed UE, and so on.

The message may include the mobility information. The mobility information indicates to eNB1 how eNB2 group UE with different group index. Then when eNB1 receives the group index from eNB2, eNB1 can know the meaning of the group index or what group of UE the index indicates.

Policy information of UE grouping can be set on command, for example mobility speed information used for distinguishing high-speed UE and low-speed UE, the UE capability information used for grouping and/or how to differentiate the UE capability. Base station 1 stores the information of corresponding base station 1. When MLB and MRO will be executed between cell of base station 1 and cell of base station 2, base station 1 can decide how to adjust mobility parameters between cell of base station 1 and cell of base station 2 according to MLB and/or MRO function information of base station 1.

This method is described based on the example of X2 setup procedure through X2 between two base stations, and when there is no X2 interface between the two base stations, this method is still applicable for the method of two base stations exchanging the information through S1 interface and S1 message. As to different RAT base station, two base stations can exchange the information through RIM procedure.

By now, the process of two base stations exchanging MLB and/or MRO function information of UE groups in embodiment 1 of the present invention is finished.

FIG. 5 is a flowchart illustrating the procedure of two base station exchanging MLB or MRO function information of UE groups in embodiment 2 of the present invention. This embodiment can be applied when MLB self-optimization needs to be executed between two base stations, so as to obtain relevant MLB or MRO function information for the UE group on the peer side through a Resource Status Reporting Initiation process. As shown in FIG. 5, this procedure comprises:

Step 501, base station 1 sends a resource status request message to base station 2.

The message comprises MLB and/or MRO function information of base station 1, and may comprise specifically: information of whether supporting MLB and/or MRO functions for UE group, and/or information of supporting MLB and/or MRO functions for which UE groups, and/or UE grouping policy, and/or mobility processing policy information of base station 1, etc. Mobility processing policy of the base station comprises that for GBR UE for example, and/or that for non-GBR UE, and/or that for UE with CRE capability, and/or that for UE with both CRE capability and CRE configuration, and/or that for high-speed UE, and/or that for low-speed UE, and so on.

The message may include the mobility information. The mobility information indicates to eNB2 how eNB1 group UE with different group index. Then when eNB2 receives the group index from eNB1, eNB2 can know the meaning of the group index or what group of UE the index indicates.

Policy information of UE grouping can be set on command, for example mobility speed information used for distinguishing high-speed UE and low-speed UE, the UE capability information used for grouping and/or how to differentiate the UE capability. Base station 2 stores the information of corresponding base station 1. When MLB and MRO will be executed between cell of base station 1 and cell of base station 2, base station 2 can decide how to adjust mobility parameters between cell of base station 1 and cell of base station 2 according to MLB and/or MRO function information of base station 1.

Step 502, base station 2 sends a resource status response message to base station 1.

The message comprises MLB and/or MRO function information of base station 2, and may comprise specifically: information of whether supporting MLB and/or MRO functions for UE group, and/or information of supporting MLB and/or MRO functions for which UE groups, and/or UE grouping policy, and/or mobility processing policy information of base station 2, etc. Mobility processing policy of the base station comprises that for GBR UE for example, and/or that for non-GBR UE, and/or that for UE with CRE capability, and/or that for UE with both CRE capability and CRE configuration, and/or that for high-speed UE, and/or that for low-speed UE, and so on.

The message may include the mobility information. The mobility information indicates to eNB1 how eNB2 group UE with different group index. Then when eNB1 receives the group index from eNB2, eNB1 can know the meaning of the group index or what group of UE the index indicates.

Policy information of UE grouping can be set on command, for example mobility speed information used for distinguishing high-speed UE and low-speed UE, the UE capability information used for grouping and/or how to differentiate the UE capability. Base station 1 stores the information of corresponding base station 1. When MLB and MRO will be executed between cell of base station 1 and cell of base station 2, base station 1 can decide how to adjust mobility parameters between cell of base station 1 and cell of base station 2 according to MLB and/or MRO function information of base station 1.

This method is described based on the example of using Resource Status Reporting Initialization procedure, and when there is no X2 interface between the two base stations, this method is still applicable for the method of two base stations exchanging the information through S1 interface and S1 message. As to different RAT base station, two base stations can exchange the information through RIM procedure.

By now, the process of two base stations exchanging MLB and/or MRO function information of UE groups in embodiment 2 of the present invention is finished.

FIG. 6 is a flowchart illustrating the process of automatic mobility parameter change in embodiment 1 of the present invention. As shown in FIG. 6, this procedure comprises:

Step 601: base station 1 adjusts relevant mobility parameter of a certain UE group in a certain cell (source cell) under control of base station 1 for handover to a certain neighbor cell or target frequency. eNB1 sends a mobility change notification message to the neighbor cell of the source cell or the base station that control a neighbor cell working at the target frequency, like base station 2. The message comprises the UE group information that the mobility parameter change is aiming at and the cell identifier of the source cell. The UE group can be one or many of the following types:

1) UE group with non-GBR bearer or UE group with GBR bearer.

2) UE group receiving uplink service or UE group receiving downlink service.

3) UE group with non-GBR bearer in uplink or UE group with non-GBR bearer in downlink.

4) UE group with GBR bearer in uplink or UE group with GBR bearer in downlink.

5) high-speed UE group or low-speed UE group

6) UE group with CRE configuration or UE group without CRE configuration.

7) UE groups with different UE capabilities. Like UE group with the capability of supporting CRE and UE group without the capability of supporting CRE.

The message may clearly comprise information of the specified UE group or an index of UE grouping. Specific grouping information corresponding to this index is preset or is configured by Operation And Maintenance (OAM) center. The neighbor base station gets to know that base station 1 performed mobility parameter configuration change for which group UE according to grouping information in the message, or the neighbor base station gets to know that base station 1 performed mobility parameter configuration change for which grouped UE according to grouping index in the message and the predefined group information or OAM configuration.

The message further comprises cell identifier of the cell in base station 2 and/or the frequency to which the mobility parameter is adjusted in the base station 1. The cell identifier is used to denote the mobility parameter to which cell of base station 2 is adjusted from the source cell (namely mobility parameter from the cell under control of base station 1 to the cell in base station is adjusted).

eNB1 may consider the capability of eNB2 when trigger the procedure e.g. whether eNB2 supporting MLB and/or MRO functions for UE group, and/or supporting MLB and/or MRO functions for which UE groups, and/or UE grouping policy of eNB2. eNB1 can know the above-mentioned capability of eNB2 through the procedure in FIG. 4 or FIG. 5.

Step 602: base station 2 decides whether to make mobility parameter change for corresponding UE group in the cell of eNB2 for handover to the source cell (eNB1 cell) or the source frequency (the frequency of eNB1 cell) according to the change in cell of eNB1. Base station 2 sends a mobility change confirmation message to base station 1. The mobility change confirmation message is not a mandatory step in this invention. The invention includes the method with this step and without this step. The mobility change confirmation message comprises mobility processing policy of base station 2 or mobility processing policy of base station 2 for the UE group. The response message may further comprise mobility information of base station 2, and the mobility information notifies base station 1 how base station 2 groups UE with the mobility information indexes. Base station 1 gets to know the meaning of the index or to which UE the index is applied when receiving the mobility information index from base station 2.

This method is described by taking the example that two base stations exchange information through X2 interface, and when there is no X2 interface in between, this method is also applicable when the two base stations perform mobility parameter automatic change by S1 message through S1 interface. As to base stations in different RAT, mobility parameter automatic change procedure between the two base stations can be performed by a RIM procedure.

By now, the whole process of mobility parameter automatic change in the present embodiment 1 is finished.

FIG. 7 is a flowchart illustrating the process of automatic mobility parameter change in embodiment 2 of the present invention. As shown in FIG. 7, this procedure comprises:

Step 701: base station 1 send mobility change request message to eNB2. eNB1 request eNB2 to adjust mobility parameter for a certain UE group for handover from cell in eNB2 to cell in eNB1 or to the frequency of cell in eNB1. The message comprises UE group information that the mobility parameter change is aiming at. The UE group can be one of or many of the following types:

1) UE group with non-GBR bearer or UE group with GBR bearer.

2) UE group receiving uplink service or UE group receiving downlink service.

3) UE group with non-GBR bearer in uplink or UE group with non-GBR bearer in downlink.

4) UE group with GBR bearer in uplink or UE group with GBR bearer in downlink.

5) high-speed UE group or low-speed UE group

6) UE group with CRE configuration or UE group without CRE configuration.

7) UE groups with different UE capabilities. Like UE group with the capability of supporting CRE and UE group without the capability of supporting CRE.

The message may clearly comprise information of the specified UE group or an index of UE grouping. Specific grouping information corresponding to this index is preset or is configured by Operation And Maintenance (OAM) center. The neighbor base station gets to know the corresponding UE group for which base station 1 requested to perform mobility parameter configuration change according to grouping information in the message, or according to grouping index in the message and the predefined group information or OAM configuration. The request message that base station 1 sends to base station 2 may comprise mobility processing policy of base station 1. Mobility processing policy of base station 1 is the same as step 302, which is not to be illustrated here anymore.

The message that base station 1 sends to base station 2 further comprises mobility information of this UE or UE group and/or the requested handover trigger change. The mobility information may be the same as that described in regulation 36.423 or a new defined group id, and it can be an index, or be a specific handover parameter, if the target base station can accept the requested handover trigger change, the target base station can apply this change to all UEs with the same mobility information or similar mobility information or all UEs in the UE group that this UE is in.

The message further comprises cell identifier of the cell in base station 2. The identifier is used to denote the mobility parameter of which cell in base station 2 need to be adjusted for handover to the target cell (namely the cell under control of base station 1) or to which frequency (namely the working frequency of the cell under control of base station 1). The message further comprises cell identifier of the cell in base station 1 or working frequency of the cell in base station 1.

Step 702: according to the request of base station 1, the cell under control of base station 2 decides whether to apply the mobility parameter change for corresponding UE group. Base station 2 sends a mobility change confirmation message to base station 1.

If base station 2 cannot accept the request of base station 1, base station 2 sends a failure message to base station 1. The failure message comprises mobility processing policy of base station 2. In the success response message sent by base station 2, the message may also comprise mobility processing policy of base station 2 or mobility processing policy of base station 2 for the UE group. The success response message may further comprise mobility information of base station 2, and the mobility information notifies base station 1 how base station 2 groups UE with the mobility information indexes. Base station 1 gets to know the meaning of the index or to which group UE the index indicate when receiving the mobility information index from base station 2.

This method is described by taking the example that two base stations exchange information through X2 interface, and when there is no X2 interface in between, this method is also applicable when the two base stations perform mobility parameter automatic change by S1 message through S1 interface. As to base stations in different RAT, mobility parameter automatic change procedure between the two base stations can be performed by a RIM procedure.

By now, the whole process of mobility parameter automatic change in the present embodiment 2 is finished.

FIG. 8 is a flowchart illustrating the process of automatic mobility parameter change in embodiment 3 of the present invention. As shown in FIG. 8, this process comprises:

Step 801, source base station S-eNB decides to hand over UE.

Step 802, the source base station sends a handover request message to target base station T-eNB. The source base station comprises information of the UE group that the UE is in, and UE grouping information is the same as step 301, which is not to be illustrated here; source base station comprises its mobility processing policy to this UE, and the mobility processing policy information is the same as step 301, which is not to be illustrated here; the message comprises threshold information for which the mobility information need to be changed to this UE or this UE group; the message may further comprise relative value of handover trigger change in the source cell for this UE or the UE group that this UE is in; the message may further comprise relative value of handover trigger change that the source base station request to the target base station for this UE or the UE group that this UE is in for handover from the target base station to the source base station, or the threshold for which the handover trigger change is applied to this UE or this UE group that source base station request the target base station for handover from the target base station to the source base station. The target station decides to apply the handover trigger change or handover trigger parameter change of this UE or the UE group that this UE is in from the target base station to the source base station according to the received information. The handover request message further comprises mobility information of this UE and/or the requested handover trigger change. The mobility information may be the same as that described in 3GPP regulation 36.423 or new defined group id, and can be an index, or be a specific handover parameter, if the target base station can accept the requested handover trigger change, the target base station can apply this change to all UEs with the same mobility information or similar mobility information or all UEs in the UE group that this UE is in.

Step 803, the target base station accepts the requested handover, the target base station sends a handover response message to the source base station. If the handover request comprises mobility processing policy or mobility parameter change for this UE or UE group this UE is in, the target base station can apply the corresponding mobility processing policy or handover trigger change for this UE or the UE group. If target base station cannot accept the request of source base station, the target base station may send a handover preparation failure message to the source base station. The failure message comprises mobility processing policy of base station 2, or mobility processing policy of base station 2 to this UE, or mobility processing policy to the UE group this UE is in. The failure message may further comprise mobility information of base station 2, and the mobility information notifies base station 1 how base station 2 groups UE with the mobility information indexes. Base station 1 gets to know the meaning of the index or to which group UE the index is applied when receiving the mobility information index from base station 2.

Step 804, the source base station sends RRC connection reconfiguration message to UE.

Step 805, UE sends RRC connection reconfiguration message to target base station.

Step 806, target base station sends path switch request message to MME.

Step 807, MME sends path switch request confirmation message to target base station.

Step 808, target base station sends resource release message to source base station.

By now, the whole process of mobility parameter automatic change of embodiment 3 is finished.

FIG. 9 is a flowchart illustrating the process of automatic mobility parameter change in embodiment 4 of the present invention. As shown in FIG. 9, this process comprises:

Step 901, source base station S-eNB decides to hand over UE.

Step 902, SeNB sends Handover Required message to the MME.

The SeNB comprises information of the UE group that the UE is in, and UE grouping information is the same as step 301, which is not to be illustrated here; SeNB comprises its mobility processing policy to this UE, and the mobility processing policy information is the same as step 301, which is not to be illustrated here; the message comprises threshold information for which the mobility information need to be changed to this UE or this UE group; the message may further comprise relative value of handover trigger change in the source cell for this UE or the UE group that this UE is in; the message may further comprise relative value of handover trigger change that the source base station request to the target base station for this UE or the UE group that this UE is in for handover from the target base station to the source base station, or the threshold for which the handover trigger change is applied to this UE or this UE group that source base station request the target base station for handover from the target base station to the source base station. The target station decides to apply the handover trigger change or handover trigger parameter change of this UE or the UE group that this UE is in from the target base station to the source base station according to the received information. The handover required message further comprises mobility information of this UE and/or the requested handover trigger change. The mobility information may be the same as that described in 3GPP regulation 36.423 or new defined group id, and can be an index, or be a specific handover parameter, if the target base station can accept the requested handover trigger change, the target base station can apply this change to all UEs with the same mobility information or similar mobility information or all UEs in the UE group that this UE is in.

information comprised in the above-mentioned handover required is sent to target base station through MME as in step 903, and the information can be comprised in handover required message and the handover request message in step 903, or be directly comprised in the transparent transmitter from the source to the target of handover required and handover request message. The target base station decides to adjust handover trigger or handover trigger parameter of this UE or the UE group that this UE is in from the target base station to the source base station according to the received information.

Step 903, MME sends a handover request message to target base station. The information comprised in the handover request in step 902 is also comprised in the handover request message, which is not to be illustrated hereby.

Step 904, target base station accepts the requested handover, and sends a handover request confirmation message to MME. If the handover request comprises mobility processing policy or mobility parameter change for this UE or UE group this UE is in, the target base station can apply the corresponding mobility processing policy or handover trigger change for this UE or the UE group. If target base station cannot accept the request of source base station, the target base station may send a handover preparation failure message to the MME. The failure message comprises mobility processing policy of base station 2, or mobility processing policy of base station 2 to this UE, or mobility processing policy to the UE group this UE is in. The failure message may further comprise mobility information of base station 2, and the mobility information notifies base station 1 how base station 2 groups UE with the mobility information indexes. Base station 1 gets to know the meaning of the index or to which group UE the index is applied when receiving the mobility information index from base station 2. The information comprised in the handover preparation failure message is sent to the source base station through MME. When target base station accepts the requested handover and the mobility parameter change, target base station may also comprise mobility processing policy of base station 2, or mobility processing policy of base station 2 to this UE, or mobility processing policy to the UE group this UE is in the success response message. The handover request confirmation message may comprise mobility information of base station 2, and the mobility information is used to notify base station 1 how base station 2 group UE with the mobility information index. Base station 1 gets to know the meaning of the index or to which group UE the index is applied when receiving the mobility information index from base station 2 subsequently. The information is sent to source base station through MME.

Step 905, MME sends a handover command message to source base station. If MME receives handover preparation failure message from target base station, MME sends a handover preparation failure to source base station. The handover command or handover preparation failure message comprises information elements received from the target base station in step 904.

Step 906, source base station sends RRC connection reconfiguration message to UE.

Step 907, UE sends RRC connection reconfiguration complete message to target base station.

Step 908, target base station sends handover notify message to MME.

By now, the whole process of mobility parameter automatic change in embodiment 4 is finished.

It can be seen from the above technical scheme that, the method of self-optimization for UE group provided by the present invention can implement mobility parameter automatic change for different UE groups by grouping UE into different groups, so that mobility parameter automatic change accuracy and efficiency are improved, and it is guaranteed that mobility parameter change will not bring in negative problems. By applying the method provided by the present invention, different base stations can adjust mobility parameters of different UE groups pertinently according to practical situations of cell resources and UE, so as to implement self-optimization of UE groups, make maximum use of radio resource and system resource, better support automatic parameter change in case of MLB self-optimization and MRO self-optimization, so that performance of mobile communication system is improved.

The above description is just a preferable embodiment of the present application, not used to limit the present application, and any modification, equivalent replacement and improvement within spirit and principle of the present application are within protection scope of the present application.

The invention claimed is:

1. A self-optimizing method for a user equipment (UE) group in a communication system, the method comprising:
    transmitting, by a first base station (BS) of a first cell to a second BS of a second cell, a first message comprising information identifying at least one UE group supported by the first BS, the at least one UE group comprising a plurality of UEs having a common characteristic related to at least one mobility parameter, and information of first mobility processing policy of the first BS for each of the at least one UE group supported by the first BS;
    receiving, by the first BS from the second BS, a second message comprising information identifying at least one UE group supported by the second BS, and information of second mobility processing policy of the second BS for each of the at least one UE group supported by the second BS;
    adjusting, by the first BS of the first cell, the at least one mobility parameter of a specified UE group from the first cell to the second cell, based on the common characteristic of the specified UE group, the first mobility processing policy, and the second mobility processing policy;
    transmitting, by the first BS to the second BS of the second cell, a third message comprising information regarding the adjusted at least one mobility parameter for the specified UE group in the first cell; and
    determining, by the second BS of the second cell, which manner to take to adjust one or more mobility parameters for the specified UE group from the second cell to the first cell according to the received information regarding the adjusted at least one mobility parameter for the specified UE group in the first cell,
wherein the third message further comprises at least one of cell identifier of the first cell or the second cell, and frequency information for handover.

2. The method according to claim 1, wherein the specified UE group comprises: a UE group with only a non-Guarantee Bit Rate (non-GBR) bearer or a UE group with a Guarantee Bit Rate (GBR) bearer, a UE group with the non-GBR bearer only in a downlink channel or a UE group with the non-GBR bearer only in an uplink channel, a UE group with the GBR bearer only in downlink channel or a UE group with the GBR bearer only in uplink channel, a UE group with an uplink service or a UE group with a downlink service, a high-speed UE group or a low-speed UE group, or a UE group with CRE configuration or a UE group without CRE configuration.

3. The method according to claim 2, wherein the at least one mobility parameter of the UE group with the GBR bearer from a cell to its neighbor cell is adjusted according to the available GBR resources in the cell and its neighbor cell;
the at least one mobility parameter of the UE group with the non-GBR bearer from the cell to the neighbor cell is adjusted according to at least one of the non-GBR uplink or downlink available resource in the cell and the neighbor cell; or
the at least one mobility parameter of the UE group with the GBR bearer in uplink or that of UE group with GBR bearer in downlink from the cell to the neighbor cell is adjusted according to the GBR uplink or downlink available resource in the cell and the neighbor cell.

4. The method according to claim 2, wherein the at least one mobility parameter of a high-speed UE group is adjusted according to a load situation of a macro BS cell and its neighbor pico BS cell; and
when radio link failure (RLF) or handover failure happens between the macro BS cell and the neighbor pico BS cell, adjust the at least one mobility parameter of the high-speed UE group or the UE group configured with CRE configuration from the macro BS cell to the neighbor pico BS cell.

5. The method according to claim 1, further comprising:
before adjusting the at least one mobility parameter of the specified UE group from the first cell to the second cell, exchanging, by the first BS of the first cell, with the second BS of the second cell, function information regarding at least one of: a Mobile Load Balance (MLB) or a Mobile Robustness (MRO) for the UE group.

6. The method according to claim 5, wherein the function information of at least one of the MLB or the MRO for the UE group comprises: information identifying whether the first BS supports at least one of the MLB or the MRO functions for the UE group, information related to which one or more UE groups the first BS supports the MLB or the MRO functions, or information of policy by which the first BS performs UE grouping.

7. The method according to claim 6, wherein the information of policy for the UE grouping comprises: mobility state information used to differentiate a high-speed UE and a low-speed UE, UE capability information based on which UE grouping is performed when a UE capability is taken into account, quality of service (QoS) information of services received by the UE according to which UE grouping is performed, or mobility parameter relevant information according to which UE grouping is performed.

8. The method according to claim 5, wherein an X2 interface is utilized to transmit the information when adjusting the at least one mobility parameter of the specified UE group from the first cell to the second cell, and an X2 Setup or Resource Report Initialization procedure is utilized to exchange function information of at least one of the MLB or MRO functions for the UE group when exchanging with the second BS of the second cell the function information of at least one of the MLB or the MRO for the UE group.

9. The method according to claim 5, wherein the information regarding the adjusted at least one mobility parameter for the specified UE group in the first cell is transmitted by utilizing an S1 interface when adjusting the at least one mobility parameter of the specified UE group from the first cell to the second cell, and the function information of at least one of the MLB function and the MRO function for the UE group is exchanged by utilizing an S1 message through the S1 interface when exchanging with the second BS of the second cell the function information of at least one of the MLB or the MRO for the UE group.

10. The method according to claim 5, wherein the information regarding the adjusted at least one mobility parameter for the specified UE group in the first cell is transmitted through a RIM procedure when adjusting the at least one mobility parameter of the specified UE group from the first cell to the second cell, and the function information of the MLB and the MRO for the UE group is exchanged through the RIM procedure when exchanging with the second BS of the second cell the function information of at least one of the MLB or the MRO for the UE group.

11. The method according to claim 1, wherein the at least one mobility parameter of the UE group receiving an uplink service or one or more UEs of the UE group receiving a downlink service from a cell to its neighbor cell is adjusted according to an uplink available resource and a downlink available resource of the cell and the neighbor cell.

12. The method according to claim 1, wherein, when adjusting the at least one mobility parameter of the specified UE group from the first cell to the second cell, the cell adjusts the at least one mobility parameter of the specified UE group or the UE group to a frequency or to a radio access technology that is different from the radio access technology of the cell; and
wherein transmitting of the third message to the second BS of the second cell comprises: notifying base stations of all neighbor cells working at the frequency or in the other radio access technology of the neighbor cell.

13. The method according to claim 1, wherein adjusting the at least one mobility parameter comprises a handover trigger change or a cell reselecting parameter change.

14. The method according to claim 1, wherein the transmitting of the third message to the second BS of the second cell comprises grouping information or grouping index of the specified UE group when adjusting the at least one mobility parameter of the specified UE group from the first cell to the second cell.

15. The method according to claim 14, wherein when the third message comprises a grouping index of the specified UE group, grouping information corresponding to the grouping index being preset or being configured by Operation And Maintenance (OAM) center, wherein the second BS of the second cell determines the UE group corresponding to the received grouping index according to the presetting or OAM configuration.

16. A self-optimizing method for a user equipment (UE) group in a communication system, the method comprising:

transmitting, by a first base station (BS) of a first cell to a second BS of a second cell, a first message comprising information identifying at least one UE group supported by the first BS, the at least one UE group comprising a plurality of UEs having a common characteristic related to at least one mobility parameter, and information of first mobility processing policy of the first BS for each of the at least one UE group supported by the first BS;

receiving, by the first BS from the second BS, a second message comprising information identifying at least one UE group supported by the second BS, and information of second mobility processing policy of the second BS for each of the at least one UE group supported by the second BS;

transmitting, by the first base station of the first cell, a third message for requesting a second base station of a second cell to adjust the at least one mobility parameter for a specified UE group from the second cell to the first cell, wherein the third message comprises information for adjusting the at least one mobility parameter, wherein the first base station determines a change to the at least one mobility parameter based on the common characteristic of the specified UE group, the first mobility processing policy, and the second mobility processing policy; and determining, by the second base station of the second cell, which manner to take to adjust the at least one mobility parameter for the specified UE group according to the received information for adjusting the at least one mobility parameter, and wherein the third message further comprises at least one of cell identifier of the first base station or the second base station, and frequency information for handover.

17. The method according to claim 16, wherein adjusting the at least one mobility parameter change comprises a handover trigger change or a cell reselecting parameter change.

18. The method according to claim 16, wherein the third message comprises grouping information or grouping index of the specified UE group when adjusting the at least one mobility parameter of the specified UE group from the first cell to the second cell.

19. The method according to claim 16, wherein when the third message comprises a grouping index of the specified UE group, grouping information corresponding to the grouping index being preset or being configured by Operation And Maintenance (OAM) center, wherein the second base station of the second cell determines the UE group corresponding to the received grouping index according to the presetting or OAM configuration.

20. The method according to claim 16, wherein the at least one mobility parameter of the UE group receiving an uplink service or one or more UEs of the UE group receiving a downlink service from a cell to its neighbor cell is adjusted according to an uplink available resource and a downlink available resource of the cell and the neighbor cell.

* * * * *